INVENTOR.
Vincent W. Eckel &
Lawrence A. Sanchez
by [signature] ATTORNEY.

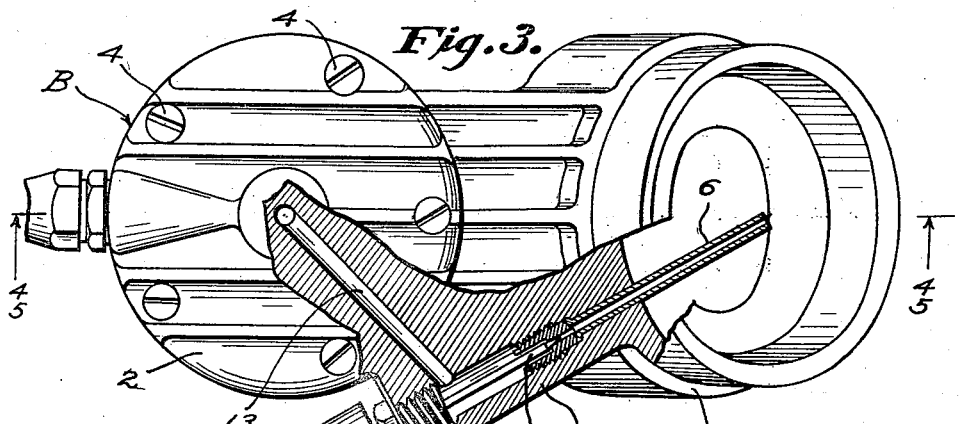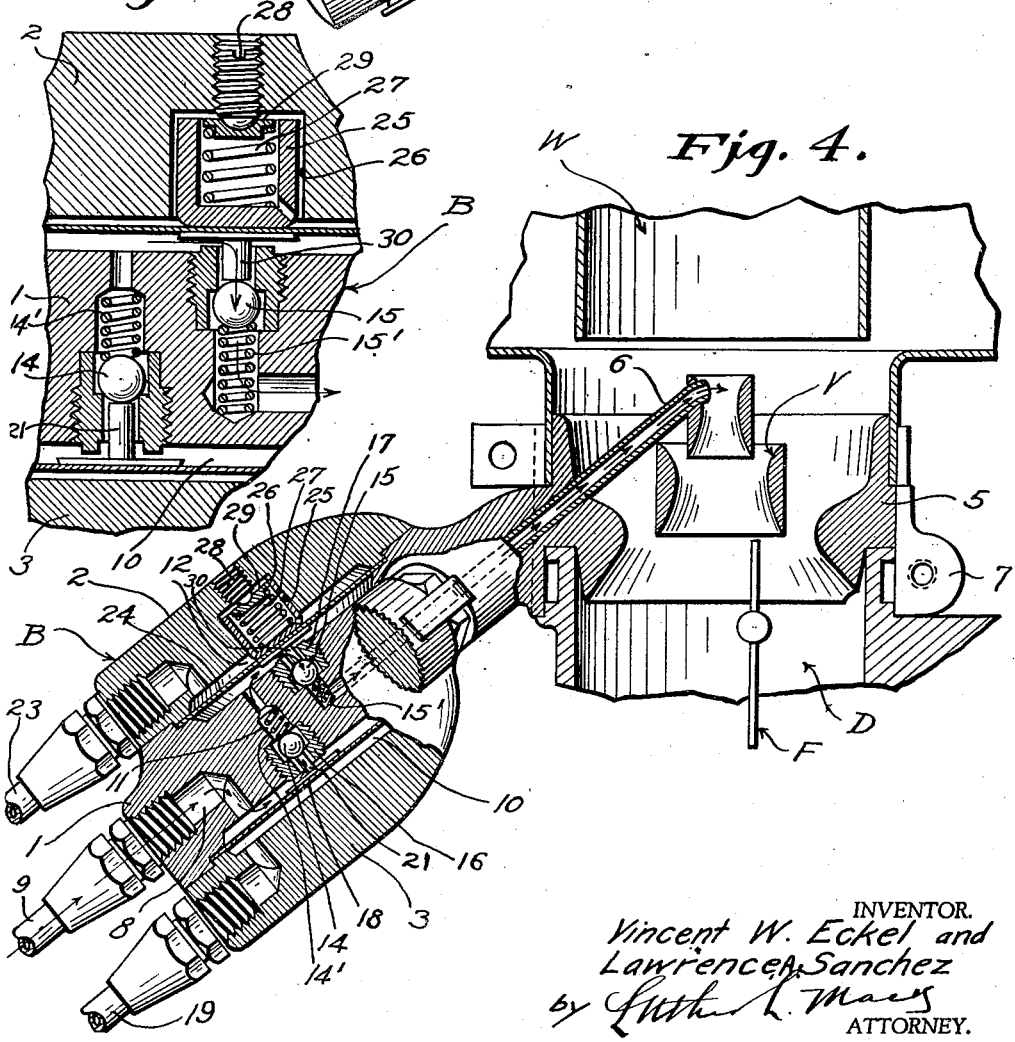

Patented Mar. 31, 1942

2,277,749

UNITED STATES PATENT OFFICE 2,277,749

DEVICE FOR INTRODUCING COMBUSTION CONTROLLING AND OTHER SUBSTANCES INTO INTERNAL COMBUSTION ENGINES

Vincent W. Eckel, Alhambra, and Lawrence A. Sanchez, Huntington Park, Calif., assignors, by mesne assignments, to Octanizers, Incorporated, Huntington Park, Calif., a corporation of California Application April 1, 1939, Serial No. 265,576

4 Claims. (Cl. 123—198)

Our invention relates in general to improvements in internal combustion engines and more particularly resides in the provision of a simple and efficient device which is primarily designed for introducing a combustion controlling or modifying substance such as an anti-knock compound into the cylinders of an engine through the fuel intake provision thereof without requiring the addition or admixture of the compound with the fuel before the latter is placed in or while it is stored in the engine storage tank, and may be likewise employed for introducing other substances, such as lubricants and carbon removing compounds, all for the purpose of improving the operation of and preserving the engine.

One of the purposes of our invention is to provide a means for automatically introducing an anti-knock compound, as aforesaid only when the demands or operating conditions of the engine require such compound, whereby under free running, light load, and other engine conditions wherein "knocking" or "detonation" does not occur, no anti-knock compound is introduced, but immediately upon development of "knocking" or "detonation" conditions a requisite amount of anti-knock compound will be introduced for eliminating such objectionable detonation conditions.

Another purpose of our invention is to provide a device such as described for introducing an anti-knock or other substance through the carburetor as by feeding it through the air intake of the carburetor, whereby in the case of substances which are introduced for controlling or modifying combustion, the proper admixture thereof will take place in the carburetor, the substance and fuel becoming as it were a properly "carbureted" mixture.

Another purpose of our invention is to provide a device such as described in which the feed of combustion controlling or other substances to the engine may be automatically started, controlled and stopped by forces developed by and during the operation and upon the stopping of the engine, for example, as by employment of spring-loaded valves which are controlled by oil pressure, suction, or other engine developed forces.

We have shown in the accompanying drawings a preferred form of device for introducing combustion controlling and other substances into an internal combustion engine embodying my invention, subject however, to modification within the scope of the appended claims, without departing from the spirit of our invention.

In the drawings:

Figure 3 is a fragmentary top plan view of the valved injector as when removed from the engine;

Figure 4 is an enlarged fragmentary vertical section showing the manner of attaching the injector to the air intake pipe of a down draft carburetor and particularly showing the valves for controlling the operation of the injector taken on line 4—4 of Figure 3;

Figure 5 is an enlarged fragmentary section taken on line 5—5 of Figure 3.

Figure 1:
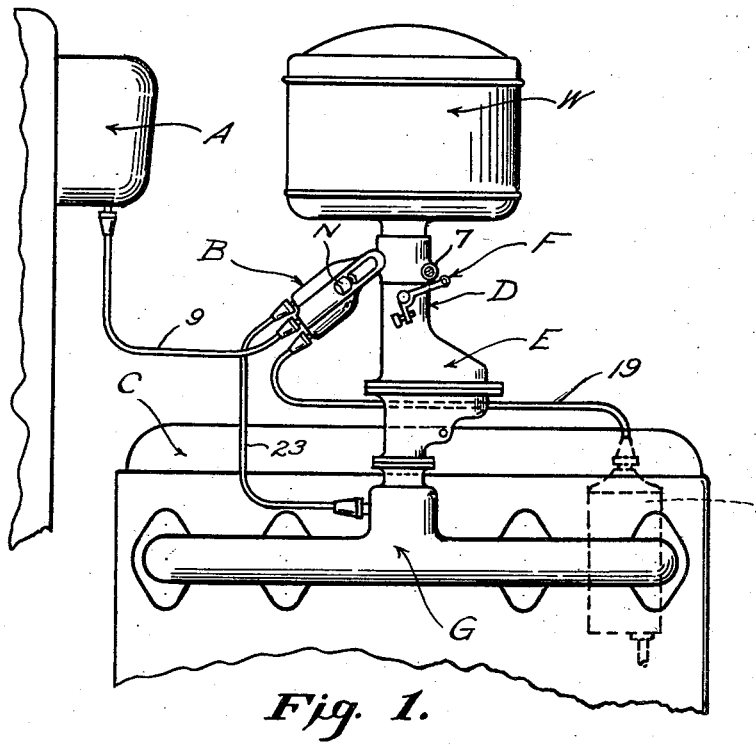
Figure 1 is a fragmentary side elevation of one embodiment of our invention as when applied to an internal combustion engine.
Figure 2:
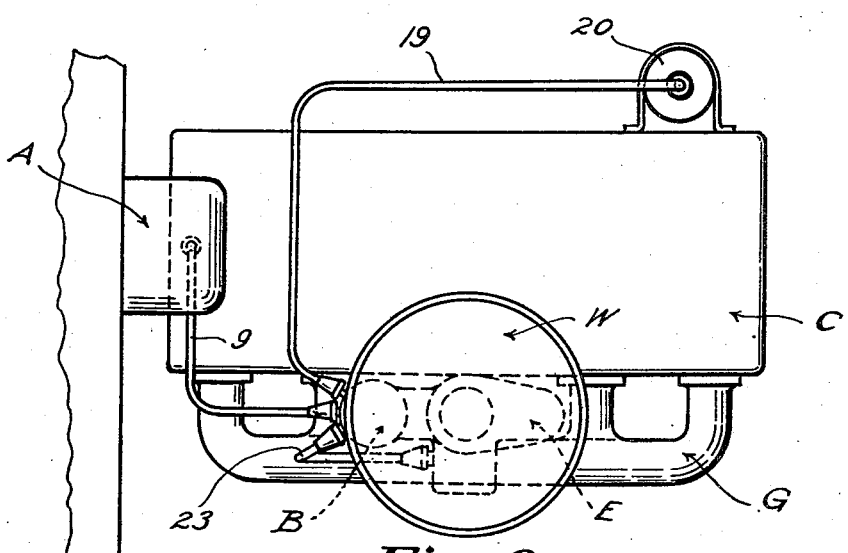
Figure 2 is a top plan view of the apparatus shown in Figure 1.

One form of injector device embodying our invention (as shown in detail in the accompanying drawings) generally comprises a storage tank A for a supply of anti-knock compound or other substance, such as a lubricant or a carbon remover, and an injector B for introducing the substance from said tank into an internal combustion engine C.

In accordance with our invention, the injector B may be connected with the fuel feed provisions of the engine at various points, provided it will, by reason of the fuel intaking action of the engine, be introduced into the engine cylinders. In the present instance, the injector B is connected with the air intake pipe D of a down draft carburetor E between the intake end of said pipe and the choke valve F. This arrangement causes the substance to be drawn through the carburetor and mixed with or added to the regular fuel before passing into the cylinders through the intake manifold G.

It will now be apparent that by means of our invention the operation of an internal combustion engine may be greatly improved and the efficiency thereof increased due to the fact that we provide for an introduction of an anti-knock compound only when needed rather than at all times as a component of the regular fuel as heretofore practised. Consequently, our invention comprehends and includes within its concept means whereby the anti-knock compound may be introduced into the cylinders, preferably but not necessarily, by the fuel intaking action of the engine only when needed, and without adding the compound to the fuel before or after placing it in the engine fuel storage tank for continuous feed thereof to the engine.

We may employ a means as here shown for automatically introducing the anti-knock compound when the engine tends to "detonate" the fuel as often takes place under high speed, heavy load, quick acceleration, and other conditions of engine operation.

One way of automatically introducing the anti-knock compound takes into consideration the use of spring-loaded valves operated by engine developed forces such as oil pressure and vacuum, although we may use other forces or means developed in or operated by the engine.

In the embodiment of our invention here shown, the injector B comprises a sectional body portion made up of a center section 1 having upper and lower sections 2 and 3 secured thereto by fastenings 4. The center section 1 is formed as a casting having an integral attaching sleeve 5 which is adapted to be positioned as shown in Figure 4 between the air intake pipe D and air washer W of the carburetor. Extending from the center section 1 through the sleeve 5 is an injector tube 6 for introducing the anti-knock compound or other substance into the pipe D for delivery to the engine as will be later more fully described. The sleeve 5 is provided with clamping means 7 whereby to secure the injector B in place. The sleeve 5 readily lends itself to a triple Venturi arrangement designated V and shown in Figure 4, to best entrain the injected anti-knock, or other compounds, with the air stream in the intake pipe D. Preferably, the sleeve 5 is attached above the choke valve F as shown in Figure 4.

The center section 1 of the body portion is provided at its outer end with an intake passage 8 to which is connected a pipe line 9 from the storage tank A. This passage 9 is L-shaped and opens into a diaphragm chamber 10 formed between the sections 1 and 3. Another feed passage 11 extends transversely through the center section 1 from a point in communication with the chamber 10 to a point of communication with a similar diaphragm chamber 12 formed between the sections 1 and 2 of the body.

Another angularly extending feed passage 13 is formed in the section 1 of the body so that one end is in communication with the chamber 12 while the other is in communication with the inner end of the injector tube 6. It is thus seen that the passages 8, 11, and 13, together with the chambers 10 and 12 define a tortuous feed passage from feed pipe 9 to the injector tube 6.

Ball valves 14 and 15 loaded by springs 14' and 15' are respectively operative in the passages 11 and 13, said valves being respectively seated in bushings 16 and 17 in said passages.

As here provided, valve 14 is arranged to be opened by the pressure of the oil in the lubrication system of the engine as soon as the engine is started and while running but will close upon stopping the engine. Valve 15 is arranged to be opened only when the engine is operated under conditions such as would produce detonation of the fuel. Thus valve 14 will be held open at all times during operation of the engine while valve 15 will be closed until a predetermined vacuum is developed in the fuel intake line of the engine, such predetermined vacuum being that developed when the engine tends to detonate the fuel charges in the cylinders thereof.

While we are aware of the fact that any suitable valve means operated in various ways by the engine may be employed in our device provided the injection of anti-knock compound is controlled and takes place only when engine conditions approach the fuel detonating point, we find that the valve means here shown is well suited. Accordingly, the valve 14 is controlled by a diaphragm 18 in the chamber 10, said chamber being connected on one side of the diaphragm with a pipe line 19 leading to the element 20 of the lubricating system of the engine, this element being the oil cleaner. However, line 19 may be coupled at any point in the lubrication system wherein the oil is under pressure during operation of the engine. Pressure of the oil against diaphragm 18 will move the diaphragm towards valve 14 so that a projection 21 on the diaphragm will engage and unseat the valve 14, holding the same open as long as the engine is operated.

Chamber 12 is connected with a pipe line 23 leading (as shown in Figure 1) to the intake manifold G, whereby a diaphragm 24 in said chamber may be moved to control valve 15. On the suction side of the chamber 12 is a thimble or cup 25 mounted for sliding movement in a recess 26 in the body section 2. A spring 27 adjustable by means of the screw 28 and plate 29 is mounted in the cup 25 and urges the latter against the diaphragm 24 so that a projection 30 on the opposite face of the diaphragm will engage and unseat valve 15. Although valve 15 is spring-loaded so as to be normally seated, the spring 27 is stronger and therefore the valve 15 will be normally held unseated. However, when the engine created vacuum reduces the pressure in the upper side of the chamber 12 below atmospheric, the pressure of the anti-knock compound in the lower side of chamber 12 being at least atmospheric, may or may not raise the diaphragm depending on the extent of the pressure reduction above the diaphragm. The relative tension of spring 27 and the spring 15' are such that but a slight fluid pressure differential on opposite sides of the diaphragm is necessary to cause the valve 15 to open and close. The adjusting screw 28 makes possible a close setting of the valve operating mechanism within the desired limits.

When the engine is operated in such manner that the fuel does not tend to detonate in the cylinders, a greater vacuum is created than when a detonating condition is reached, and, therefore, the pressure in chamber 12 above diaphragm 24, is reduced to an extent that the pressure (atmospheric) of the anti-knock solution in chamber 12 below said diaphragm, aided by the spring 15', becomes effective to lift the diaphragm against the action of spring 27, whereby said valve will be closed and thereby prevent introduction of the anti-knock fluid into the engine.

However, when the engine approaches a detonating condition and introduction of the anti-knock compound is then required to prevent detonation, the manifold vacuum and the vacuum in chamber 12 are relatively low so that the pressure above the diaphragm 24 and force of the spring 27 overcome the pressure of the anti-knock compound below said diaphragm and the force of spring 15, whereby the spring 27 will depress the diaphragm and cause the projection 30 thereon to unseat valve 15. This allows the anti-knock compound to pass through the injector and tube 6 into the air intake pipe D and from there through the carburetor and with the regular fuel enter the cylinder of the engine.

For regulating the volume flow of anti-knock compound into the pipe D, a needle valve N is provided in injector B as shown in Figure 3.

It is now seen that the valves 14 and 15 provide for an automatic control of the injector B so that the anti-knock compound is introduced only when demanded by operating conditions of the engine. It should be noted that when the engine stops, the spring 27 will always be operative to depress the diaphragm and open the valve 15, but at this time, due to cessation of oil pressure, the valve 14 will be closed by its spring 14' and, therefore, the feed of anti-knock or other substance past valve 14 will be prevented to avoid waste of such substance.

It should be noted that our invention not only embraces a novel apparatus for effecting a controlled introduction of an anti-knock compound or other substance into the engine, only when needed, but includes a new method of operating and controlling the engine through the steps of continuously feeding regular fuel to the engine and intermittently feeding thereto from a source separate from the regular fuel a substance for promoting an efficient operation of the engine. The steps of feeding the fuel and said substances are independent except that in the preferred embodiment of the invention the fuel intaking and other engine developed forces are utilized to induce the feed of such substance and to also determine the times at which the substance will be introduced while the feed of regular fuel is continuous.

What we claim as new is:

1. A device for introducing an anti-knock compound into the cylinders of an internal combustion engine, including a source of supply of such compound apart from the source of supply of fuel for the engine, and means adapted for feeding such compound from said source into the fuel feed line of the engine, a normally closed valve for shutting off the feed of said compound to said line, another valve for controlling the feed of said compound to said line, means adapted to operate responsive to a force developed in and when said engine is operated, for opening said normally closed valve, and other means automatically adapted to open the second-named valve responsive to forces developed in the engine when the engine is operated in such manner as to cause a detonation of the fuel.

2. A device for introducing an anti-knock compound into the cylinders of an internal combustion engine, including a source of supply of such compound apart from the source of supply of fuel for the engine, and means adapted for feeding such compound from said source into the fuel feed line of the engine, a normally closed valve for shutting off the feed of said compound, another valve for controlling the feed of said compound, and means controlled by the engine for automatically opening and closing said valves.

3. A device for introducing an anti-knock compound into the cylinders of an internal combustion engine, including a source of supply of such compound apart from the source of supply of fuel for the engine, and means adapted for feeding such compound from said source into the fuel feed line of the engine, a normally closed valve for shutting off the feed of said compound, another valve for controlling the feed of said compound, and means controlled by the engine for automatically opening and closing said valves, including devices which actuate the valves responsive to engine created vacuum and the working pressure of the lubricant in the lubrication system of the engine.

4. A device for introducing an anti-knock compound into the cylinders of an internal combustion engine, including a source of supply of such compound apart from the source of supply of fuel for the engine, and means adapted for feeding such compound from said source into the fuel feed line of the engine, a normally closed valve for shutting off the feed of said compound, another valve for controlling the feed of said compound, and means controlled by the engine for automatically opening and closing said valves, including a diaphragm adapted to automatically effect an actuation of one valve responsive to differential in pressures created in the fuel feed line and by the pressure of the compound in the means for feeding such compound to the feed line, and another diaphragm adapted to operate the other valve responsive to a differential in the pressure of the lubricant in the engine.

VINCENT W. ECKEL.
LAWRENCE A. SANCHEZ.